United States Patent [19]

Owens et al.

[11] 4,007,122
[45] Feb. 8, 1977

[54] SOLID ELECTROLYTES FOR USE IN SOLID STATE ELECTROCHEMICAL DEVICES

[75] Inventors: Boone B. Owens, Apple Valley; Hilton J. Hanson, Farmington, both of Minn.

[73] Assignee: Gould Inc., Rolling Meadows, Ill.

[22] Filed: Apr. 28, 1975

[21] Appl. No.: 571,953

Related U.S. Application Data

[63] Continuation-in-part of Ser. No. 465,432, April 29, 1974, abandoned.

[52] U.S. Cl. .............................. 252/62.2; 317/230; 324/94; 429/193
[51] Int. Cl.² ..................... H01G 1/00; H01M 6/06
[58] Field of Search .................... 324/94; 136/153; 252/62.2; 317/230

[56] References Cited

UNITED STATES PATENTS

| | | | |
|---|---|---|---|
| 3,346,423 | 10/1967 | Smyth et al. | 136/153 |
| 3,541,124 | 11/1970 | Owens | 252/62.2 X |
| 3,713,897 | 1/1973 | Liang | 136/153 |

*Primary Examiner*—Jack Cooper
*Attorney, Agent, or Firm*—Leydig, Voit, Osann, Mayer & Holt, Ltd.

[57] ABSTRACT

Solid electrolytes including a lithium halide and a controlled amount of water provide materials having adequate ionic conductivity and low electronic conductivity so as to be useful in solid state electrochemical devices such as electric cells, timers, capacitors, coulometers and rechargeable batteries. In a preferred embodiment, the solid electrolyte further includes a third component such as a high surface area oxide, silica, alumina or mixtures thereof being preferred.

10 Claims, 11 Drawing Figures

SOLID ELECTROLYTES FOR USE IN SOLID STATE ELECTROCHEMICAL DEVICES

RELATED APPLICATION

Owens and Hanson, Ser. No. 465,432, filed Apr. 29, 1974, for: "Solid Electrolytes, now abandoned, Solid State Electrochemical Devices Using Said Solid Electrolytes, And A Method For Forming Such Electrolytes"; the present application being a continuation-in-part thereof.

This invention relates to solid state electrochemical devices, and more particularly, to solid electrolytes for use in such devices.

In recent years, applications in the electronic field have resulted in the development of a wide variety of solid state electrochemical devices, such as electric cells, primary and rechargeable batteries, timers, coulometers and capacitors. The advantages in comparison to devices using conventional liquid electrolytes are significant. The utilization of solid electrolytes provides for rugged construction, a long shelf life and, of course, the absence of electrolyte leakage. Such solid electrolyte devices are further more readily adaptable to miniaturization.

However, it has also been long recognized that the functional characteristics of any solid state electrochemical device depend to a significant extent on the ionic conductivity of the solid electrolyte used therein. Considerable effort has accordingly been directed toward the development of solid electrolytes which have relatively low values of ionic resistance but which have a high electronic resistance.

To this end, a number of materials have been suggested for use as solid electrolytes. U.S. Pat. No. 3,713,897 to Liang discloses a low temperature lithium ion solid electrolyte material which is stated to have an ionic conductivity at least one order of magnitude higher than prior low temperature lithium ion solid electrolytes. The solid electrolyte materials disclosed contain LiI, LiOH and $Al_2O_3$, but one of the specific materials shown does not include LiOH. The percentages of the respective components are stated to appear to be not critical.

It is an object of the present invention to provide solid electrolytes having superior properties and which are suitable for use in solid state electrochemical devices.

Another and more specific object lies in the provision of solid electrolytes characterized by adequate ionic conductivity together with relatively low electronic conductivity.

A further object is to provide a novel method for forming such electrolytes.

A still further object provides solid state electrochemical devices employing such an electrolyte.

Other objects and advantages of the present invention will become apparent in the following description and in the accompanying drawings, in which:

While the invention is susceptible of various modifications and alternative forms, certain specific embodiments thereof have been illustrated and will be described in detail herein. It should be understood, however, that it is not intended to limit the invention to the particular forms disclosed, but, on the contrary, the intention is to cover all modifications, equivalents and alternatives falling within the spirit and scope of the invention. For example, while specific embodiments of certain solid state electrochemical devices have been shown, it should be appreciated that these embodiments are merely illustrative; the present invention is equally applicable to use in connection with any solid state electrochemical device.

Briefly, and in accordance with the present invention, it has been found that the ionic conductivity of a lithium halide solid electrolyte, preferably containing a third component such as a high surface area, non-conductive oxide or binder, i.e. — alumina or silica, or both, can be significantly enhanced by incorporating therein controlled amounts of water. This effect appears to be particularly dramatic in the case of the species other than iodide inasmuch as the resulting conductivity levels which can be achieved may be better than with lithium iodide despite the fact that the conductivity of the iodide species without water would appear to be the most promising.

The water need only be present in an amount which is sufficient to increase the conductivity of the electrolyte over that of the pure lithium halide species. The incorporation of at least 0.5 percent by weight of water, based upon the total weight of the electrolyte, provides a significant increase in the ionic conductivity. It is preferred to maintain the water content in the range of from about 2 to about 20 percent by weight, and, most preferably, particularly in the case of the iodide species, to incorporate sufficient water to yield the pure lithium halide monohydrate phase, which is detectable by standard X-ray diffraction techniques, and coexists with the lithium halide phase. It does not appear that a monohydrate phase forms with the fluoride species. The amount necessary to provide such a monohydrate phase will vary depending upon which halide is involved and, if used, upon the specific binder or oxide (e.g. — silica or alumina) that is employed. For electrolytes using amorphous silica having surface areas of about 275 m.$^2$/gm., a lithium iodide monohydrate phase was detected when the water content was of the order of about 3.5 percent. With electrolytes using alumina having a surface area of about 85 m.$^2$/gm., the monohydrate phase was detected when the water content was about 5 percent by weight.

The water content needed to effect the desired enhancement of the ionic conductivity for a specific lithium halide electrolyte can be readily determined. The amount should also be controlled as an excess will impair the performance of the electrolyte in actual usage. In general, the expected maximum level of tolerable water may be estimated as the stoichiometric amount needed to form the pure monohydrate phase with the amount of the lithium halide present. This upper water limit, based upon the total weight of the lithium halide and water is about 12% for the iodide, 17% for the bromide and 30% for the chloride. The comparable level for the fluoride is about 41%. It should, however, be appreciated that, when used, the third component, such as the oxide, will take up a certain amount of water, so that the total water content of the solid electrolyte can exceed the stoichiometric amounts set forth herein. Thus, typically, when an oxide or the like is used, the total amount of water present in the electrolyte will correspond to a mole ratio of lithium halide to water of from about 0.1 to about 1.65.

While the lithium halide-water solid electrolyte can be used as such, it has generally been found desirable to employ a third component such as a high surface area oxide. Any binder material may be used as the third component which allows the solid electrolyte to be processed for the intended application and does not adversely affect the properties of the solid electrolyte to the extent that the electrolyte is unusable for the application intended. The inclusion in the electrolyte of silica, alumina, or a mixture thereof is preferred inasmuch as further enhancement of the ionic conductivity results.

Figure 11B:
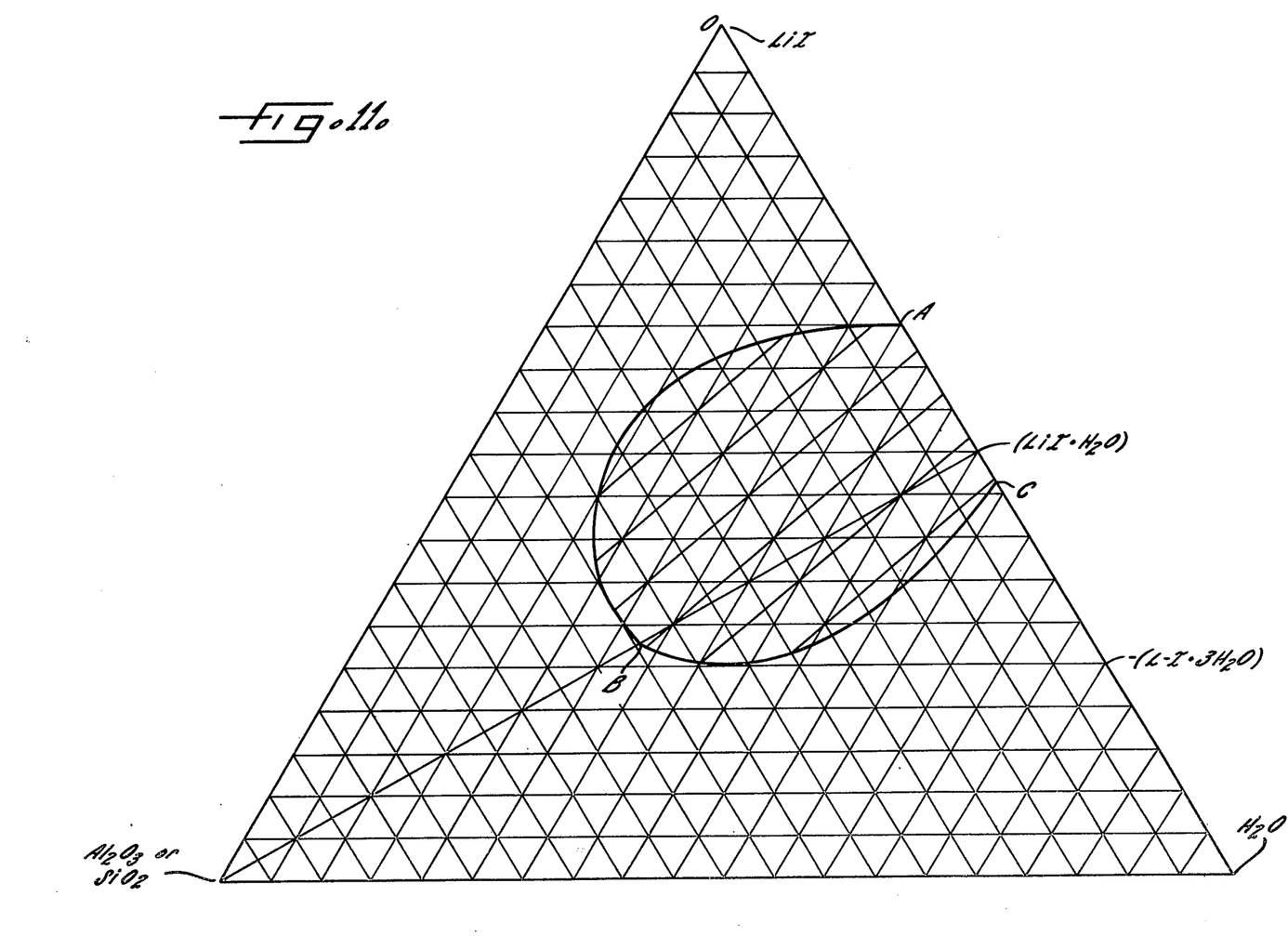
FIG. 11 is a ternary phase diagram for the lithium iodide solid electrolytes of the present invention and illustrating the compositions of apparent maximum conductivity.

When using a third component such as a binder or high surface area oxide, the amount of the lithium halide which may be employed can vary within wide limits, depending upon the properties desired. Conceptually, when a high surface area oxide is used, the oxide need be present in only an amount sufficient to increase the ionic conductivity of the resulting solid electrolyte as compared to the conductivity which can be achieved by using pure lithium halide. Typically, the oxide content can vary in the range of from about 0 to about 70 mole percent, based upon the total moles of the lithium halide and the oxide present. It is preferred to maintain the lithium halide content in a range of from about 50 to 90 mole percent and most preferably, in a range of from about 65 to 70 mole percent. FIG. 11 presents the compositions that yield the apparent maximum conductivity for the lithium iodide species, i.e., the encircled compositions within the area bounded by points A, B and C.

The amount of lithium halide utilized should be varied depending upon the type and characteristics of the oxide being used. More particularly, for a specific oxide, it will be generally useful to vary the proportions of the components to determine the relative amounts which provide the optimum conductivity. For example, as the surface area of the oxide is increased, the amount of the lithium halide which should desirably be employed is also increased. Using amorphous silica materials having a surface area in the range of from 100 to about 400 m.$^2$/gm., the mole ratio of lithium iodide to the silica can vary from 1:1 to 9:1. Typically superior results have been achieved with ratios in the range of 2:1 to 3:1 with silicas having surface areas in the upper portion of the range set forth herein. In the lower portion of the range, ratios of less than 2:1 and perhaps as low as 1:1 may be suitably utilized. As a specific example, when employing an amorphous silica of the fumed silica type having a particle size of about 0.03 microns and a surface area of about 275 m.$^2$/gm., the optimum ionic conductivity is achieved when the lithium iodide is present in an amount of from about 65 to 70 mole percent.

With respect to the oxides, solid electrolytes employing silica preferably utilize amorphous silica of the fumed silica type. Fumed, amorphous silica having a surface area in the range of from about 10 m.$^2$/gm. up to about 1,000 m.$^2$/gm. or more can be used. Silica of this type is commercially available and is formed by a flamehydrolysis process wherein silicon tetrachloride is reacted with hydrogen and oxygen in a flame to form a very fine silica together with hydrochloric acid. Particularly satisfactory results have been achieved using fumed silica having an average particle size of 0.03 microns and with a surface area of about 275 m.$^2$/gm. Superior results have also been achieved using commercially available alumina having a surface area of about 85 m.$^2$/gm.

Suitable solid electrolytes in accordance with the present invention can also be formed by utilizing mixtures of silica and alumina. The relative amounts of the mixture can be varied as desired. When mixtures are used, it will of course be necessary to determine the optimum amount of the lithium halide to be used as has been described herein. When utilizing a 50/50 mixture of alumina (having a surface area of 85 m.$^2$/gm.) and silica (having a surface area of about 275 m.$^2$/gm.), satisfactory results were achieved using a lithium iodide to oxide mole ratio of about 2:1.

The novel electrolytes of the present invention may be prepared by a slurry technique wherein the lithium halide and either alumina or silica or mixtures thereof are added to a solvent, followed by suitable drying to achieve the desired water content. The lithium halide may be dissolved in water or any liquid having some degree of solubility for both water and the lithium halide. As representative examples of suitable materials, various alcohols such as methanol and ethanol, or ketones such as acetone may be employed in mixtures with water. Desirably, of course, it is preferred to utilize a solvent which has a relatively low boiling temperature so that it may be more readily removed. The amount of the solvent used need only be that amount sufficient to dissolve the lithium halide. Also, while anhydrous lithium halide is typically used, various hydrate forms are commercially available and may also be employed.

Following the dissolution of the lithium halide, the requisite amount of the submicron size alumina or silica is then added. More uniform dispersions are typically achieved with the use of organic solvents such as the alcohols which provide gels that minimize phase separation problems. The resulting dispersion or gel is then heated to remove most of the solvent so that a paste is formed. This may be achieved by heating at a relatively low temperature, preferably low enough to prevent violent boiling, until, by visual inspection, a paste is formed which is almost dry.

Sufficient water is then added to the paste to yield a uniform solution which is then reconstituted as a paste by heating as hereinbefore described. The resulting thick paste is then placed in an environment heated to allow further removal of the solvent so as to form a solid, intermediate product. This may be achieved by heating in an air oven at a temperature in the range of 120° C for the time necessary to yield this solid, intermediate product. Heating at this temperature, as for example, for a period of 16 hours, will readily accomplish the formation of the intermediate product.

At this point, and in accordance with an important aspect of the present invention, the solid, intermediate product is then subjected to a controlled vacuum drying to yield the solid electrolyte having the desired water content. The temperature and time must be coordinated to provide the desired water content. As a representative example, particularly desirable solid electrolytes have been formed by drying in a vacuum environment at a temperature of about 150° C for a period of 2 hours at a pressure of about 200 microns of mercury. The time and temperature that are used may vary with the oxide being employed as identical drying conditions for electrolytes using alumina have yielded water levels higher than that for electrolytes including silica.

The thus-formed solid electrolyte may then be further processed by conventional means to form the desired configuration for the intended solid state electrochemical device. Thus, the solid electrolyte material is typically processed by grinding into a fine powder in conventional equipment such as a micro mill in an environment having an atmosphere which maintains the moisture content at a minimum level, e.g., below about 10 parts per million. However, higher moisture contents have been found acceptable. The solid electrolyte in fine powder form can then be formed into the desired configuration by positioning the powder between the electrode layers being employed and hydraulically pressing at elevated pressures to form the product. Often, the electrode materials will be contained in current collector cups made of materials such as stainless steel.

Figure 1:
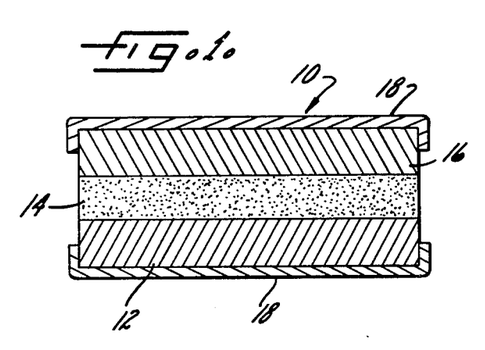
FIG. 1 is a cross-sectional view of a solid state electric cell employing a solid electrolyte of the present invention.

The solid electrolyte material of the present invention can be used in known solid state electrochemical devices. Thus, as illustrated in FIG. 1, a solid state electric cell 10 is shown which includes an anode 12, a solid electrolyte layer 14 in contact therewith and a cathode 16 in contact with the other surface of the solid electrolyte 14. Current collectors 18, 18' contain the electrodes. The anode 12 comprises a lithium-containing oxidizable material which is capable of donating electrons in an electrochemical reaction. Lithium metal or alloys thereof may suitably be used. The cathode 16 comprises a reducible, solid material which is capable of accepting electrons from the lithium-containing electron donor serving as the anode or capable of forming an alloy therewith.

A wide variety of useful materials are known for the cathode. For example, metal salts such as silver iodide and lead iodide may be used. Further, iodine or iodine complexes may be employed. It has also been found suitable to utilize organic ammonium polyiodide salts for the cathode as are described in U.S. Pat. Nos. 3,476,605, 2,566,114 and 3,057,760. In addition, the charge transfer complexes of an organic material and iodine described in U.S. Patent 3,660,163 may also be suitably used.

A particularly desirable composite cathode material may be formed by employing an organic ammonium polyiodide salt together with minor amounts of a current collector such as carbon and the solid electrolyte of the present invention. A preferred species is a cathode including tetramethylammonium pentaiodide with minor amounts of carbon and also the novel electrolytes described herein.

As will be appreciated, the type of material that may be tolerated for the cathode will depend upon the lithium halide species being utilized. With the lithium iodide species, cathodes more active than iodine-containing materials cannot be employed. However, and in accordance with one aspect of the present invention, the employment of a halide species other than iodide (vis. — chloride, bromide or fluoride) does not require an iodine-containing cathode. Accordingly, the use of these halides allows cells to be formed that will possess substantially increased cell voltages and higher energy densities.

Cathode materials that can be used for the chloride, bromide and fluoride species include polyhalogens, metal oxides, metal oxyacid salts, metal halides and interhalogens; and suitable materials are illustrated in the following U.S. Pat. Nos: 2,566,114; 2,905,740; 3,057,760; 3,476,605; 3,709,734; 3,713,897; 3,804,675 and 3,824,130.

As is also known, it may be desirable to include in the solid electrolyte layer 14 a minor amount of a getter to minimize diffusion when the cathode includes a mobile oxidant, as is shown in U.S. Pat. No. 3,661,647. Various suitable materials are known such as lithium alloys (e.g. — lithium-aluminum).

When utilizing the solid electrolytes of the present invention in a rechargeable solid state battery, the anode comprises a reversible lithium electrode; and a reversible cathode electrode is used which is compatible with the solid electrolyte. The cathode can suitably comprise an electrochemically active element and a current collector such as carbon intermixed with the solid electrolyte, solid electrolyte suitably being a major amount of the intermixture on a weight basis.

Figure 2:
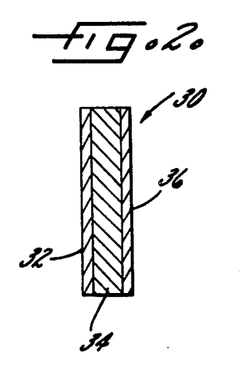
FIG. 2 is a cross-sectional view of a solid state capacitor utilizing a solid electrolyte of the present invention.

In use in connection with a solid state capacitative device, the solid electrolyte is contacted on one surface with a reversible solid electrode means for accepting ions upon a potential difference therewith of one polarity and donating ions to the solid electrolyte upon a potential difference therewith of the other polarity and a metallic and electronic electrode which is chemically non-reactive with the solid electrolyte and forms a capacitative double layer interface with the solid electrolyte. As is shown in FIG. 2, a solid state electrochemical capacitor 30 comprises a reversible solid electrode 32, a solid electrolyte 34 in accordance with the present invention and a metallic electrode 36 contacting the other surface of the solid electrolyte 34. The area of the double layer capacitative zone between the solid electrolyte 34 and the metallic electrode 36 determines the capacitance of the device, as is known. The reversible solid electrode 32 may suitably comprise lithium metal while the metallic electrode 36 may comprise any inert metal or material such as carbon or the noble metals, e.g. — platinum.

Figure 3:
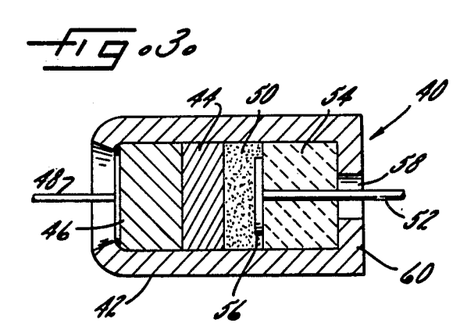
FIG. 3 is a side elevation of a solid state electrochemical timer including a solid electrolyte of this invention.

When the solid electrolytes are used in a solid state electrochemical timer, a solid anode material containing a predetermined amount of oxidizable lithium capable of donating electrons in an electrochemical reaction will be used together with an inert metal current collector which is capable of accepting the cathodic deposition of the lithium during the time operation. As is shown, the timing function can be varied as desired by changing the amount of the lithium which is used. Lithium metal may serve as the solid anode material while carbon or any other inert metal substrate may serve as the inert metal current collector.

In FIG. 3, there is shown one form of a solid state electrochemical timer that may suitably employ the solid electrolytes of the present invention. As is illustrated, the electrochemical timer 40 has a first electrode means which includes a container 42 (which may be generally tubular and electrically conducting in the timer as shown), an electrically conducting electrode plate 44 positioned within the container, a contiguous electrode plug 46 and a first electrode lead 48, connected by welding or the like to the plug. The solid electrolytes of the present invention are utilized in the form of an electrolyte plate 50, positioned within the container 42 and contiguous with the electrode plate 44. The timer 40 has a second electrode means in the form of a second electrode lead 52. An electrical insulator in the form of an insulator bead 54 positions the second electrode lead 52 within the container 42 and maintains the headed end 56 of the second electrode lead in intimate electrical contact with the solid electrolyte plate 50. The insulator bead 54 maintains the second electrode lead 52 in a spaced-apart relationship from an aperture wall 58 defined by an inwardly directed edge or flange 60 of the container 42.

As is known, the timer may be converted to a coulometer by utilizing an excess of the oxidizable lithium serving as the solid anode.

The solid electrolyte materials of the present invention and the solid state electrochemical devices employing the novel solid electrolyte that have been described herein may be further illustrated by means of the following examples. It should be understood, however, that these examples are intended to be merely illustrative, but not in limitation of, the scope of this invention.

EXAMPLE 1

Various lithium iodide-oxide solid electrolytes were prepared with varying drying conditions being employed to demonstrate the effect on the ionic conductivity of the water content of the formed electrolytes.

0.1 moles of anhydrous lithium iodide (13.39 grams) were dissolved in 5½ cc. of water and 50 cc. of methanol in a crystallizing dish. 0.05 moles of amorphous silica of the fumed type (having a particle size of 0.03 microns and a B.E.T. surface area of about 275 m.$^2$/gm.) were then stirred in, with a gel being formed.

The gel was then heated on a heating vessel at a low setting for a period of about 30 minutes until a paste was formed which, by visual inspection, was almost dry. At this point, an additional 50 cc. of water was added; and the resulting solution was then again heated to remove some of the solvent for a period of about one hour.

The resulting thick paste was then placed in an air oven for about 16 hours at a temperature of about 120° C. The resulting solid intermediate product, which at this stage was dry and crumbly upon handling, was then placed into a glass vacuum vessel. The vessel was evacuated at room temperature, with the pressure being initially about 200 microns of mercury.

Samples prepared as described herein were then subjected to drying at various temperatures for a period of about two hours.

Using the same procedure, additional samples were prepared except that 0.05 moles of a commercially available alumina (B.E.T. surface area of about 85 m.$^2$/gm.) were substituted for the silica.

Each of the samples was then placed in a dry box equipped with an argon atmosphere which maintained the moisture content below 10 p.p.m. and were ground with a conventional micro mill into a fine powder having a typical size of from about 50 to 300 mesh (Tyler).

The solid electrolyte samples were then formed into a resistance cell by conventional hydraulic techniques. The resistivity of the resistance cell was measured with a 1 kHz bridge. The water content of each sample was determined by the known Karl Fischer technique.

Figure 4:
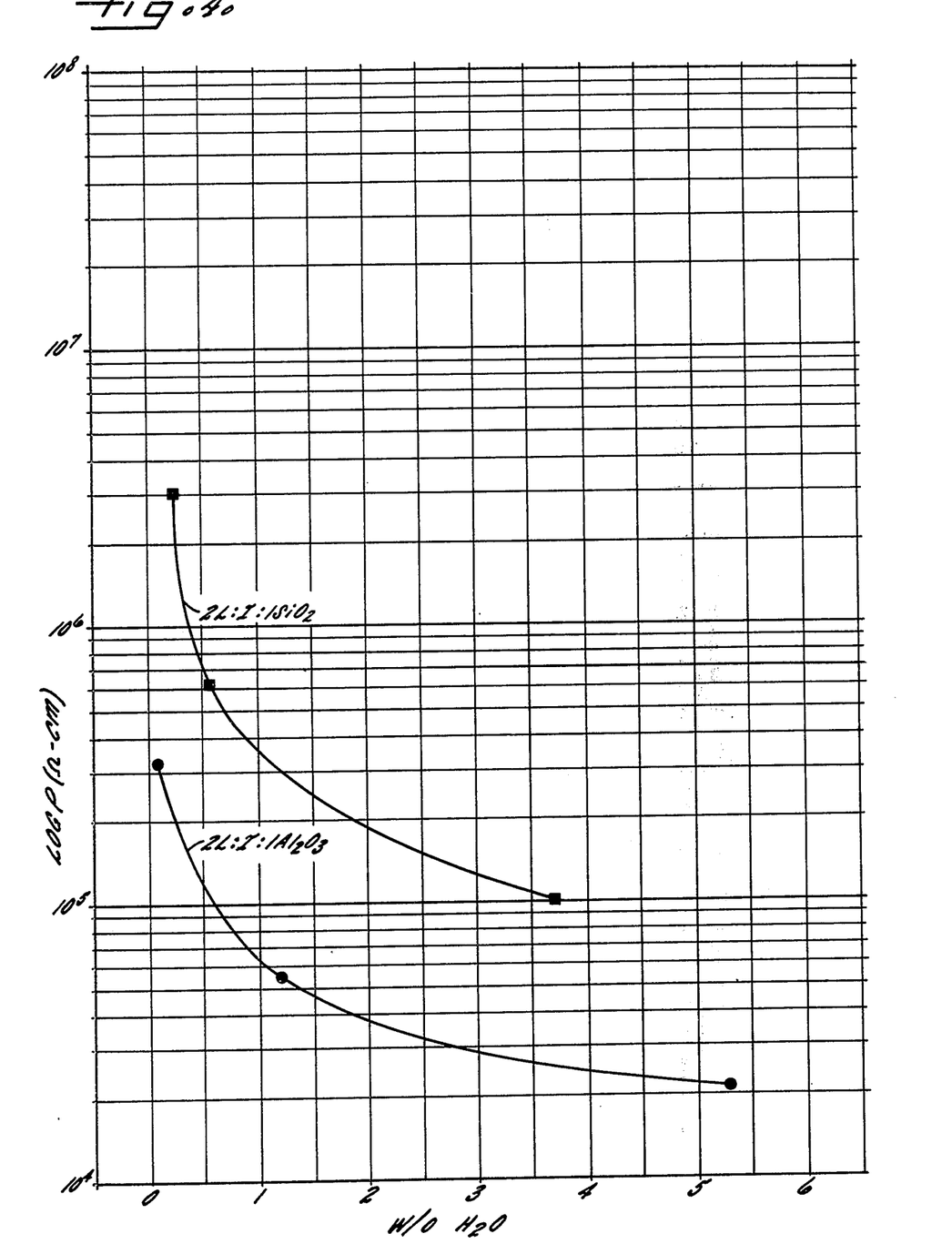
FIG. 4 is a graph of the resistivity of lithium iodide solid electrolytes versus the amount of water present therein and showing the increased conductivities which can be achieved by forming such electrolytes in a fashion so as to provide controlled amounts of water.
Figure 5:
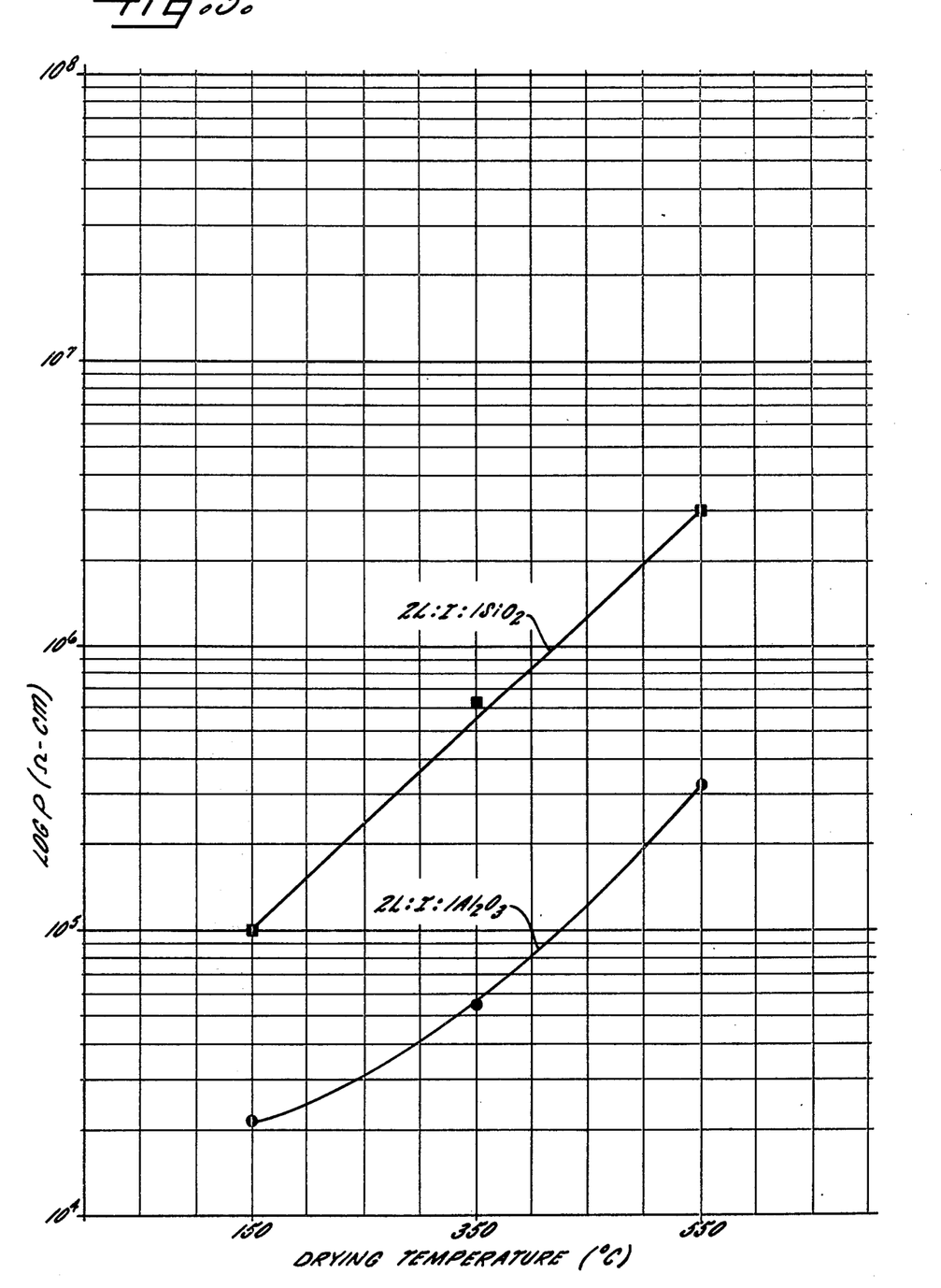
FIG. 5 is a graph of the resistivity versus the drying temperatures used in preparing the solid electrolytes having water contents as set forth in FIG. 4.

FIG. 4 is a graph of the resistivity in ohm-centimeters for the samples versus the water content. FIG. 5 shows that the resistivity is decreased as the drying temperature is decreased.

The solid electrolyte samples were analyzed by conventional X-ray diffraction techniques, and it was observed that the samples which were dried at 150° C included a lithium iodidemonohydrate phase coexisting with the lithium iodide phase.

EXAMPLE 2

To show use of the solid electrolytes of the present invention in connection with solid state electric cells, electrolytes were prepared using the preparation technique described in Example 1.

Solid electrolytes were formed using a 2:1 mole ratio of lithium iodide to alumina and a drying temperature of 150° C, and the electrolyte employed in the actual electric cells consisted of several batches which were blended together during the final grinding process in the micro mill. About 1 percent by weight of a lithium aluminum getter (20 weight percent lithium) was blended in during the grinding.

The electric cells were formed as has been described herein and were then encapsulated in a conventional epoxy material for testing. The capacity of the cells (250 mAh) was limited by the cathode, with the anode having a capacity of 900 mAh.

Figure 6:
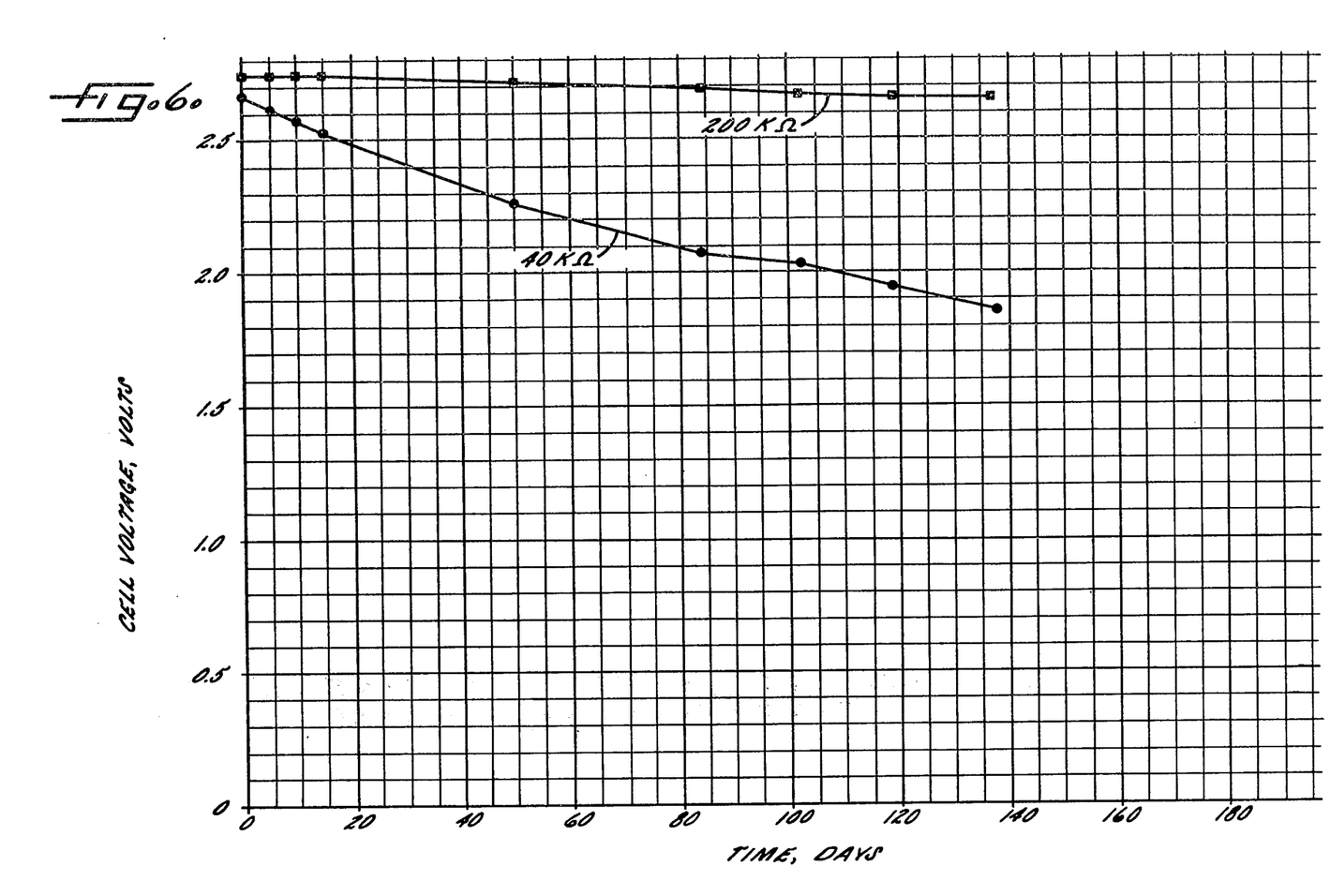
FIG. 6 is a graph of the cell voltage versus time for electric cells utilizing lithium iodide-alumina solid electrolytes in accordance with the present invention at two different loads.

The cells were designed to operate at a 5-year rate (400 K $\Omega$ load); however, in order to provide performance data, accelerated rates of 0.5 (40 K $\Omega$ load) and 2.5 (200 K $\Omega$ load) years were employed. FIG. 6 illustrates the performances of the cells, at 37° C, with the performance to greater than a 70 percent depth of discharge being shown in connection with the load of 40 K $\Omega$.

Figure 7:
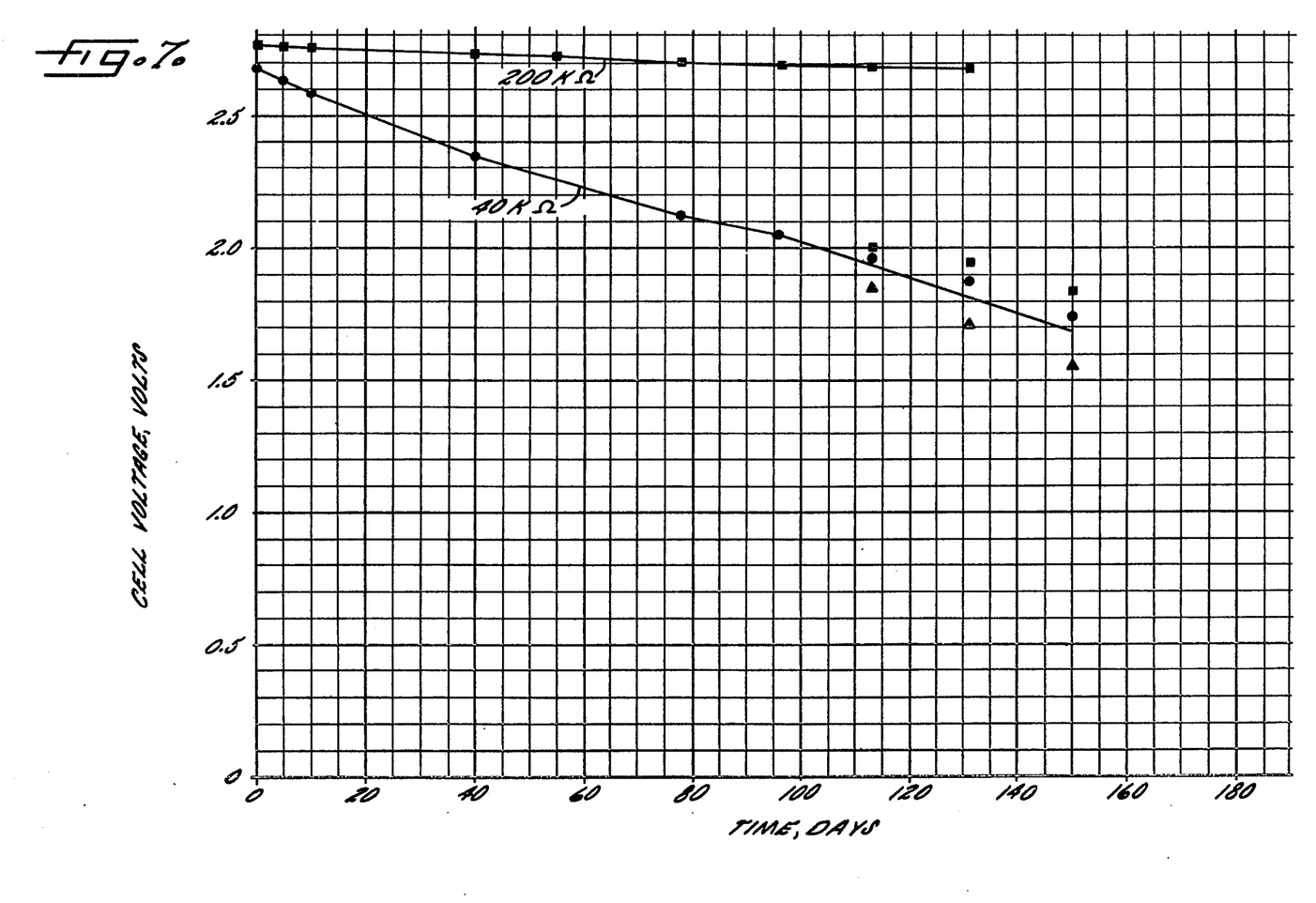
FIG. 7 is a graph similar to FIG. 6 and illustrating the voltage-time characteristics for lithium iodide-silica solid electrolyte cells in accordance with the present invention.

Utilizing an electrolyte of 2:1 lithium iodide to silica ratio and formed as described in Example 1 and dried at a temperature of 150° C, electric cells were formed in the same fashion as has been described in connection with the lithium iodide-alumina electrolyte. FIG. 7 illustrates the performance of the cells at the accelerated rates with loads of 40 K $\Omega$ and 200 K $\Omega$ loads, with the performance to greater than a 75 percent depth of discharge being shown in connection with the 40 K Ω load (discharge being carried out at 37° C).

At the 77 percent depth of discharge, the cells were allowed to equilibrate for 72 hours at open circuit. The open circuit potential rose to 2.65 volts. The cells were then loaded for 72 hours at the 5-year rate (400 K Ω load) and displayed a potential of 2.57 volts.

From the results shown in FIGS. 6 and 7, the utilization of these cells appears to be excellent, and it further appears that the discharge potential at the 5-year rate will remain high throughout the life.

EXAMPLE 3

Various lithium halide-water solid electrolytes, most also containing as a third component a high surface area oxide were prepared and then were formed into resistance cells. The resistivity of the cells was measured and the water content determined. In some instances, an analysis was also made to determine the existence of the lithium halide monohydrate phase. The procedures and analytical techniques used are described in Example 1.

The results are set forth in Table 1 below; and, as will be seen, conductive solid electrolytes are formed by a combination of combined water and lithium halide, showing that the ionic conductivity of the lithium halide hydrate is greater than that of the corresponding anhydrous lithium salt. Conductive solid electrolytes are also formed from the ternary combination of combined water, any lithium halide and a high surface area oxide. As will be seen, the ionic conductivity of the resulting electrolytes is increased by several orders of magnitude for all the lithium halide species in accordance with the present invention.

TABLE 1

| Halide | Oxide | Halide, wt. % | Oxide, wt. % | $H_2O$, wt. % | Mole Ratio (halide/oxide) | Phases Detected | Resistivity (ohm centimeters) |
|---|---|---|---|---|---|---|---|
| LiI | $SiO_2$ a) | 64.8 | 29.0 | 6.2 | 1:1 | Not Analyzed | $3.25 \times 10^5$ |
| LiI | $SiO_2$ a) | 76.0 | 17.0 | 7.0 | 2:1 | Not Analyzed | $2.20 \times 10^5$ |
| LiI | $SiO_2$ a) | 79.5 | 11.9 | 8.6 | 3:1 | Not Analyzed | $1.54 \times 10^5$ |
| LiI | $SiO_2$ a) | 81.1 | 9.1 | 9.8 | 4:1 | Not Analyzed | $9.62 \times 10^4$ |
| LiI | $SiO_2$ a) | 86.9 | 4.6 | 8.6 | 9:1 | Not Analyzed | $1.14 \times 10^5$ |
| LiI | None | 91.2 | 0 | 8.8 | ∞ | Not Analyzed | $1.11 \times 10^5$ |
| LiI | None | 85.9 | 0 | 14.1 | ∞ | Not Analyzed | $1.6 \times 10^6$ |
| LiI | None | 95.0 | 0 | 5.0 | ∞ | Not Analyzed | $2.8 \times 10^5$ |
| LiI | None | 99.6 | 0 | 0.4 | ∞ | Not Analyzed | $1.8 \times 10^6$ |
| LiI | None | 86.5 | 0 | 13.5 | ∞ | Not Analyzed | $2.1 \times 10^5$ |
| LiI | $SiO_2$ b) | 78.3 | 17.5 | 4.2 | 2:1 | Not Analyzed | $3.1 \times 10^5$ |
| LiI | $SiO_2$ b) | 79.9 | 11.9 | 8.2 | 3:1 | Not Analyzed | $1.5 \times 10^5$ |
| LiI | $SiO_2$ b) | 84.3 | 7.6 | 8.1 | 5:1 | Not Analyzed | $1.3 \times 10^5$ |
| LiI | $SiO_2$ c) | 76.5 | 17.1 | 6.4 | 2:1 | Not Analyzed | $1.6 \times 10^5$ |
| LiI | $SiO_2$ c) | 80.6 | 12.0 | 7.4 | 3:1 | Not Analyzed | $1.3 \times 10^5$ |
| LiI | $SiO_2$ c) | 85.7 | 7.7 | 6.6 | 5:1 | Not Analyzed | $1.7 \times 10^5$ |
| LiI | $SiO_2$ c) | 82.7 | 7.4 | 9.9 | 5:1 | Not Analyzed | $1.0 \times 10^5$ |
| LiI | $SiO_2$ d) | 76.2 | 17.1 | 6.7 | 2:1 | Not Analyzed | $1.7 \times 10^5$ |
| LiI | $SiO_2$ d) | 81.6 | 9.1 | 9.3 | 4:1 | Not Analyzed | $1.1 \times 10^5$ |
| LiI | $SiO_2$ d) | 83.6 | 6.2 | 10.2 | 6:1 | Not Analyzed | $8.3 \times 10^4$ |
| LiI | $Al_2O_3$ e) | 64.3 | 24.5 | 11.2 | 2:1 | Not Analyzed | $2.8 \times 10^4$ |
| LiI | $Al_2O_3$ e) | 66.7 | 25.4 | 7.9 | 2:1 | Not Analyzed | $5.2 \times 10^4$ |
| LiI | $Al_2O_3$ e) | 66.8 | 25.4 | 7.8 | 2:1 | Not Analyzed | $4.7 \times 10^4$ |
| LiI | $Al_2O_3$ e) | 67.5 | 25.7 | 6.8 | 2:1 | Not Analyzed | $7.6 \times 10^4$ |
| LiI | $Al_2O_3$ e) | 68.2 | 25.9 | 5.9 | 2:1 | Not Analyzed | $1.0 \times 10^5$ |
| LiI | $Al_2O_3$ e) | 65.2 | 24.8 | 10.0 | 2:1 | Not Analyzed | $3.4 \times 10^4$ |
| LiBr | $SiO_2$ a) | 64.2 | 22.2 | 13.6 | 2:1 | LiBr, LiBr.$H_2O$ | $7.0 \times 10^4$ |
| LiBr | None | N.A. f) | 0 | N.A. | — | N.A. | $3.9 \times 10^5$ |
| LiCl | $SiO_2$ a) | 61.5 | 21.8 | 16.7 | 4:1 | LiCl, LiCl.$H_2O$ | $1.2 \times 10^5$ |
| LiBr | $Al_2O_3$ e) | 58.0 | 34.1 | 7.9 | 2:1 | LiBr, LiBr.$H_2O$ | $4.4 \times 10^5$ |
| LiF | $SiO_2$ a) | N.A. | N.A. | N.A. | 4:1 | N.A. | $9.5 \times 10^4$ |
| LiF | $Al_2O_3$ e) | 56.6 | 33.6 | 9.8 | 6.6:1 | LiF | $7.6 \times 10^3$ |
| LiCl | $Al_2O_3$ e) | 46.3 | 34.7 | 19.0 | 3.2:1 | LiCl, LiCl.$H_2O$ | $7.2 \times 10^3$ | a) through e)
The oxides denoted are commercially available and may be further identified as follows:

| Tradename | Manufacturer | BET Surface Area($m.^2/gm.$) |
|---|---|---|
| (a) Cab-O-Sil EH5 | Cabot Corporation | 390 ± 40 |
| (b) AEROSIL COK 84 | Degussa | 170 ± 30 |
| (c) AEROSIL 200 | Degussa | 200 ± 25 |
| (d) AEROSIL 380 | Degussa | 380 ± 30 |
| (e) ALON | Cabot Corporation | 85 |
| (f) N. A. = Not Analyzed | | |

EXAMPLE 4

Figure 8:
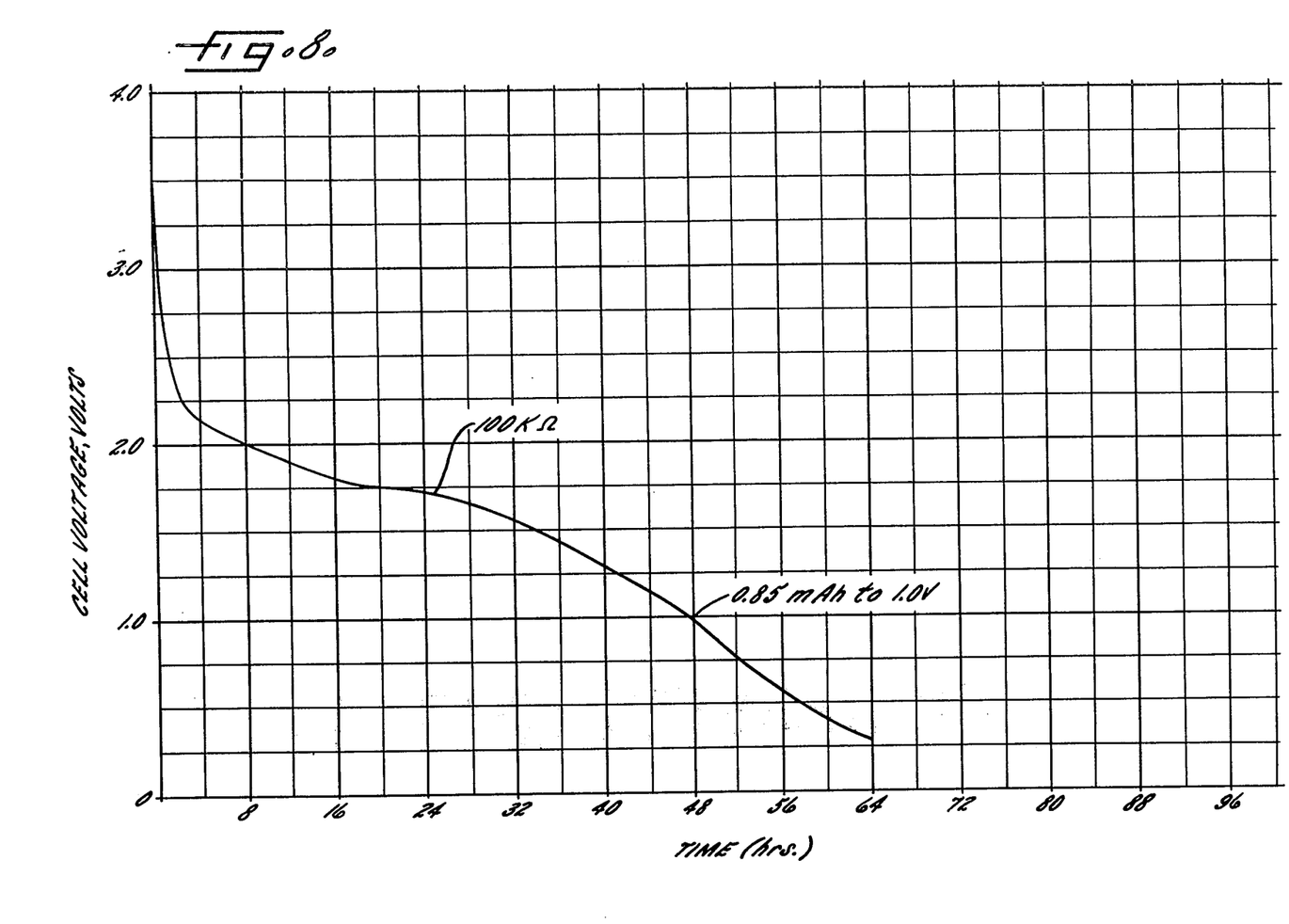
FIG. 8 is a graph showing the voltage-time characteristics for a lithium chloride-alumina solid electrolyte capacitor cell in accordance with the present invention.

To show the use of a lithium chloride-alumina-water electrolyte in connection with a solid state capacitor cell, an electrolyte was prepared using the preparation technique set forth in Example 1. The capacitor cell was formed as generally described in Example 2, except that a carbon-electrolyte mixture was used in place of the cathode. FIG. 8 illustrates the performance of the capacitor cell at a 100 K Ω load wherein it was shown to have a nominal capacity of one milliampere hour. Performance is typical of an energy storage device with storage on an inert interface by both Faradaic and capacitative mechanisms.

EXAMPLE 5

Figure 9:
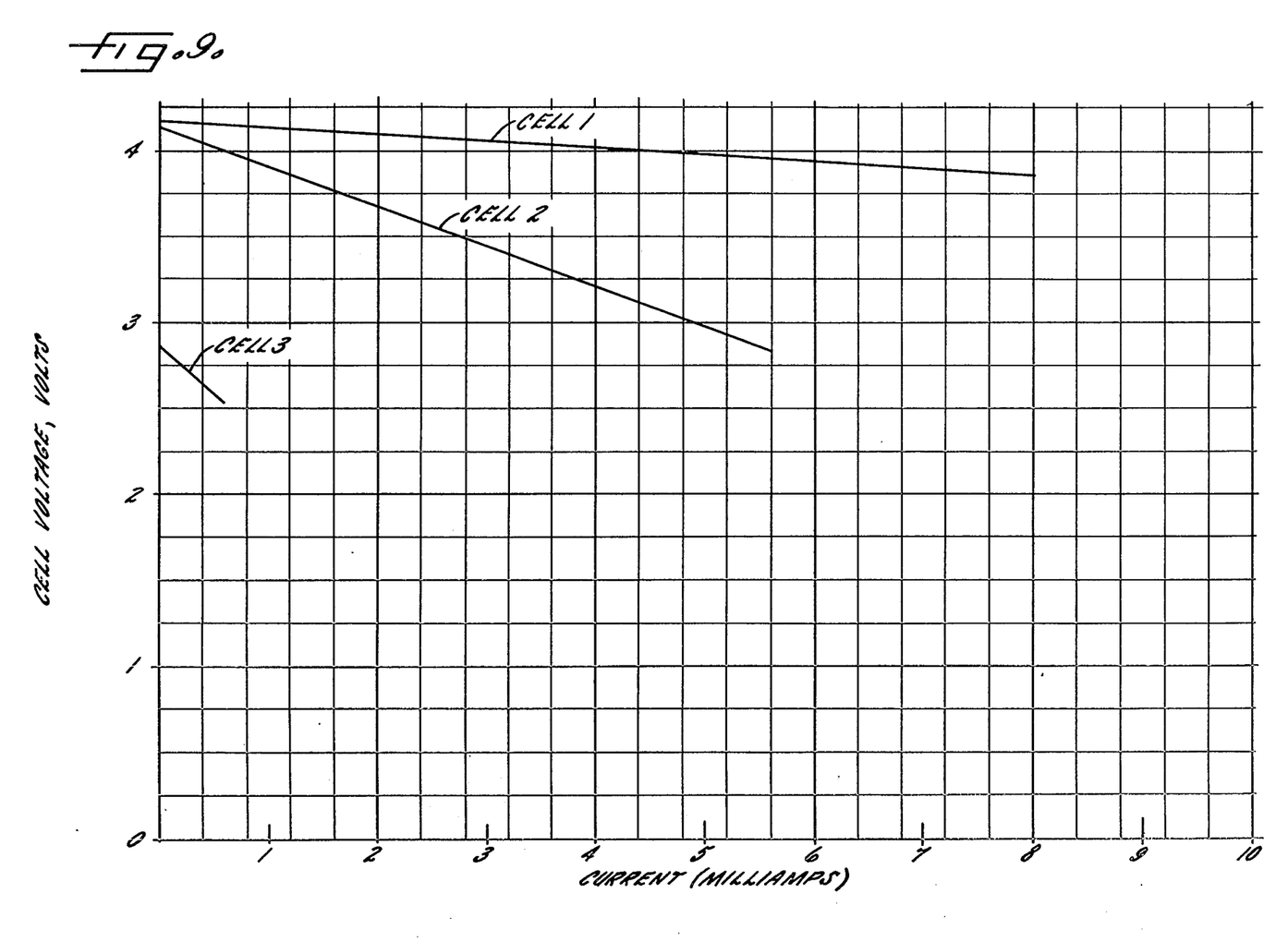
FIG. 9 is a graph of cell voltage versus current for three solid electrolyte cells utilizing solid electrolytes of the present invention.

Three solid state electrical cells were prepared as described in Example 2 using solid electrolytes formed as set forth in Example 1. The 5 second load curves for the three cells are shown in FIG. 9. Table 2 sets forth the electrolytes, cathodes and anodes employed:

TABLE 2

| Cell Number | Anode | Electrolyte | Cathode* |
|---|---|---|---|
| 1 | Lithium | LiF—$Al_2O_3$—$H_2O$ | $ICl_3$ |
| 2 | Lithium | LiCl—$Al_2O_3$—$H_2O$ | $ICl_3$ |
| 3 | Lithium | LiCl—$Al_2O_3$—$H_2O$ | $PbF_2$ |

*Minor amounts of carbon and of the electrolyte were also incorporated. Current densities of a few microamps/cm$^2$ are readily delivered at high voltages, and with the interhalogen cathode current densities of several microamps/cm$^2$ were delivered at voltages as high as three to four volts.

EXAMPLE 6

To illustrate the cell voltages which can be achieved using solid electrolytes employing a species other than the iodide species a series of solid state electrical cells were prepared as described in Example 2 using various electrolyte species formed as set forth in Example 1. The open circuit voltage was measured as was the resistivity of the various cells.

The results are shown in Table 3 together with the electrolytes, cathodes and anodes employed. As is shown, very high cell voltages are obtained which permit the fabrication of cells with very high energy densities.

TABLE 3

| Cell Number | Anode | Electrolyte | Cathode* | Open Circuit Voltage (volts) | Resistivity (ohm-centimeters) |
|---|---|---|---|---|---|
| 1 | Li—Ag | $LiBr/SiO_2/H_2O$ | triethylenediamine-dibromide | 3.30 | $7.0 \times 10^4$ |
| 2 | Li | $LiCl/SiO_2/H_2O$ | tetrachloro-1,4-diiodo-benzene | 3.87 | $1.2 \times 10^5$ |
| 3 | Li | $LiCl/SiO_2/H_2O$ | $FeCl_3$ | 3.22 | $1.2 \times 10^5$ |
| 4 | Li | $LiF/SiO_2/H_2O$ | $PbF_4$ | 3.52 | $9.5 \times 10^4$ |
| 5 | Li | $LiF/Al_2O_3/H_2O$ | $ICl_3$ | 4.20 | $7.6 \times 10^3$ |
| 6 | Li | $LiCl/Al_2O_3/H_2O$ | $ICl_3$ | 4.13 | $7.2 \times 10^3$ |
| 7 | Li | $LiCl/Al_2O_3/H_2O$ | $PbF_2$ | 2.92 | $7.2 \times 10^3$ |
| 8 | Li | $LiCl/Al_2O_3/H_2O$ | Cuprous Chromite | 2.93 | $7.2 \times 10^3$ |
| 9 | Li | $LiCl/Al_2O_3/H_2O$ | $PbO_2$ | 3.20 | $7.2 \times 10^3$ |
| 10 | Li | $LiCl/Al_2O_3/H_2O$ | $FeCl_3$ | 3.19 | $7.2 \times 10^3$ |

*Minor amounts of carbon and of the electrolyte were also incorporated.

EXAMPLE 7

Figure 10:
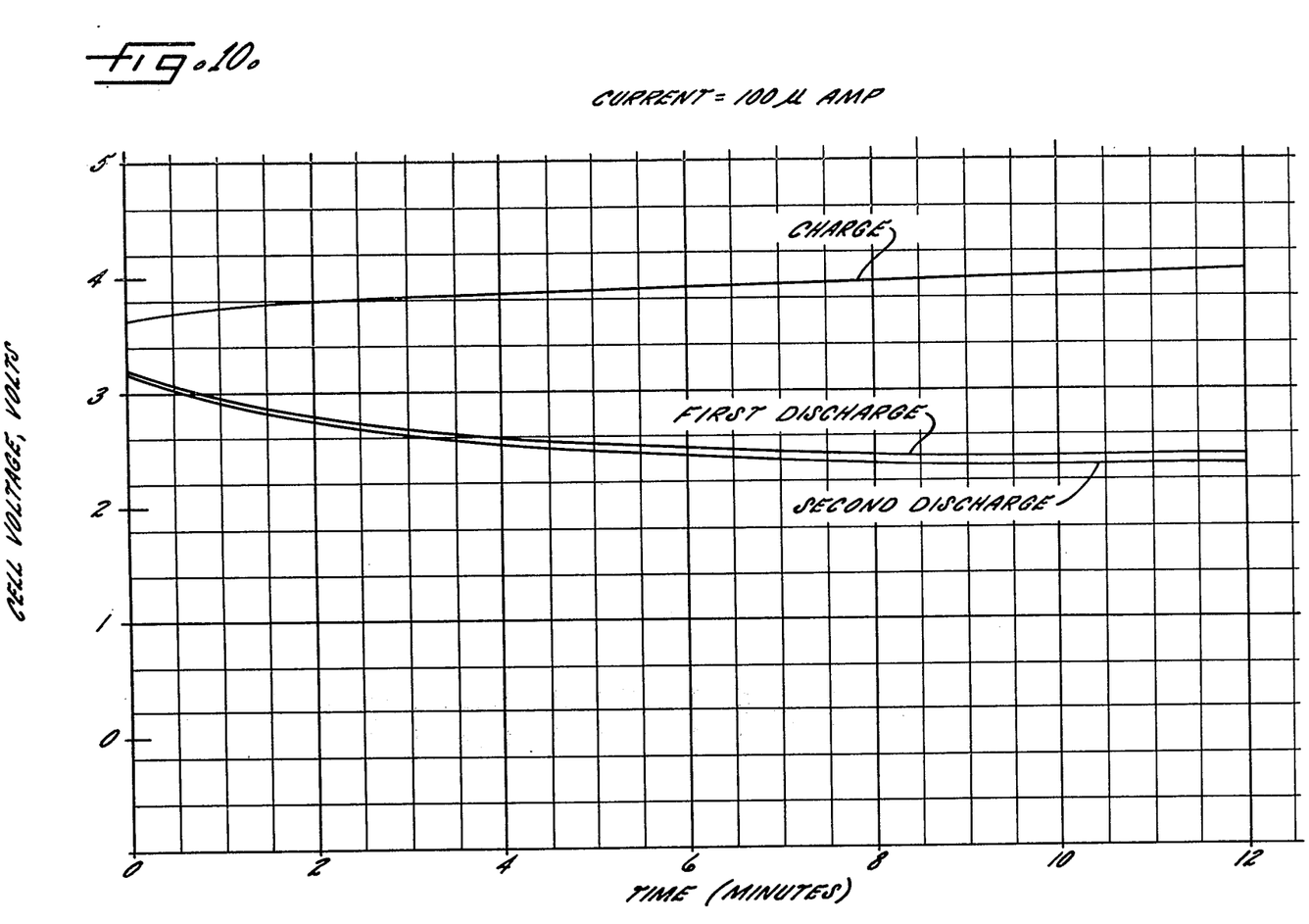
FIG. 10 is a graph of cell voltage versus time for a solid electrolyte cell with a lithium chloride-alumina electrolyte according to the present invention and showing the effects of a discharge/charge/discharge sequence.

To illustrate the performance of a cell employing a solid electrolyte of the present invention for a rechargeable battery application, cell 10 of Table 3 was subjected to a discharge/charge/discharge sequence, all at 100 microamps. FIG. 10 represents a graph of the open cell voltage versus time for the cell.

Thus, as has been seen, the present invention provides lithium halide-water solid electrolyte materials characterized by enhanced ionic conductivities due to the inclusion of a controlled water content. Further enhancement of the conductivities is provided by the inclusion of silica, alumina or mixtures thereof. Based upon the data developed it appears that the lithium iodide-silica electrolyte when used with an iodine-containing cathode exhibits relatively low rates of self-discharge due to iodine diffusion in comparison to the lithium iodide-alumina electrolytes. The use of a halide species other than iodide allows the formation of solid state electrical cells with substantially higher cell voltages and energy densities than can be achieved using the iodide species.

We claim as our invention:

1. A solid electrolyte material for a solid state electrochemical device consisting essentially of a composition of a lithium halide, an oxide selected from the group consisting of $SiO_2$, $Al_2O_3$, and mixtures thereof and water, the lithium halide being present in an amount of from about 50 to about 90 mole percent, based upon the total moles of lithium halide and the oxide, and the water being present in an amount of at least about 0.5 weight percent, based upon the total weight of the composition but in an amount insufficient to impair the performance of the solid electrolyte material.

2. The solid electrolyte of claim 1 wherein the water is present in an amount corresponding to a mole ratio of lithium halide to water of from about 0.1 to about 1.65.

3. The solid electrolyte of claim 1 wherein the water is present in an amount of from about 2 to about 20 weight percent.

4. The solid electrolyte of claim 2 wherein the lithium halide is lithium iodide and which includes a lithium iodide monohydrate phase.

5. The solid electrolyte of claim 2 wherein the lithium halide is lithium chloride and which includes a lithium chloride monohydrate phase.

6. The solid electrolyte of claim 2 wherein the lithium halide is lithium bromide and which includes a lithium bromide monohydrate phase.

7. The solid electrolyte of claim 2 wherein the lithium halide is lithium fluoride.

8. The solid electrolyte of claim 2 wherein the oxide is amorphous $SiO_2$.

9. The solid electrolyte of claim 2 wherein the oxide is amorphous $Al_2O_3$.

10. The solid electrolyte of claim 2 wherein the lithium halide is present in an amount of from about 65 to 70 mole percent, based upon the total moles of oxide and lithium halide, and the $SiO_2$ has a surface area in the range of from about 100 to 400 m.$^2$/gm.

* * * * *